March 23, 1948. R. L. MALCOM 2,438,409
ADJUSTABLE HEAD BAND CONSTRUCTION
Filed Aug. 7, 1946
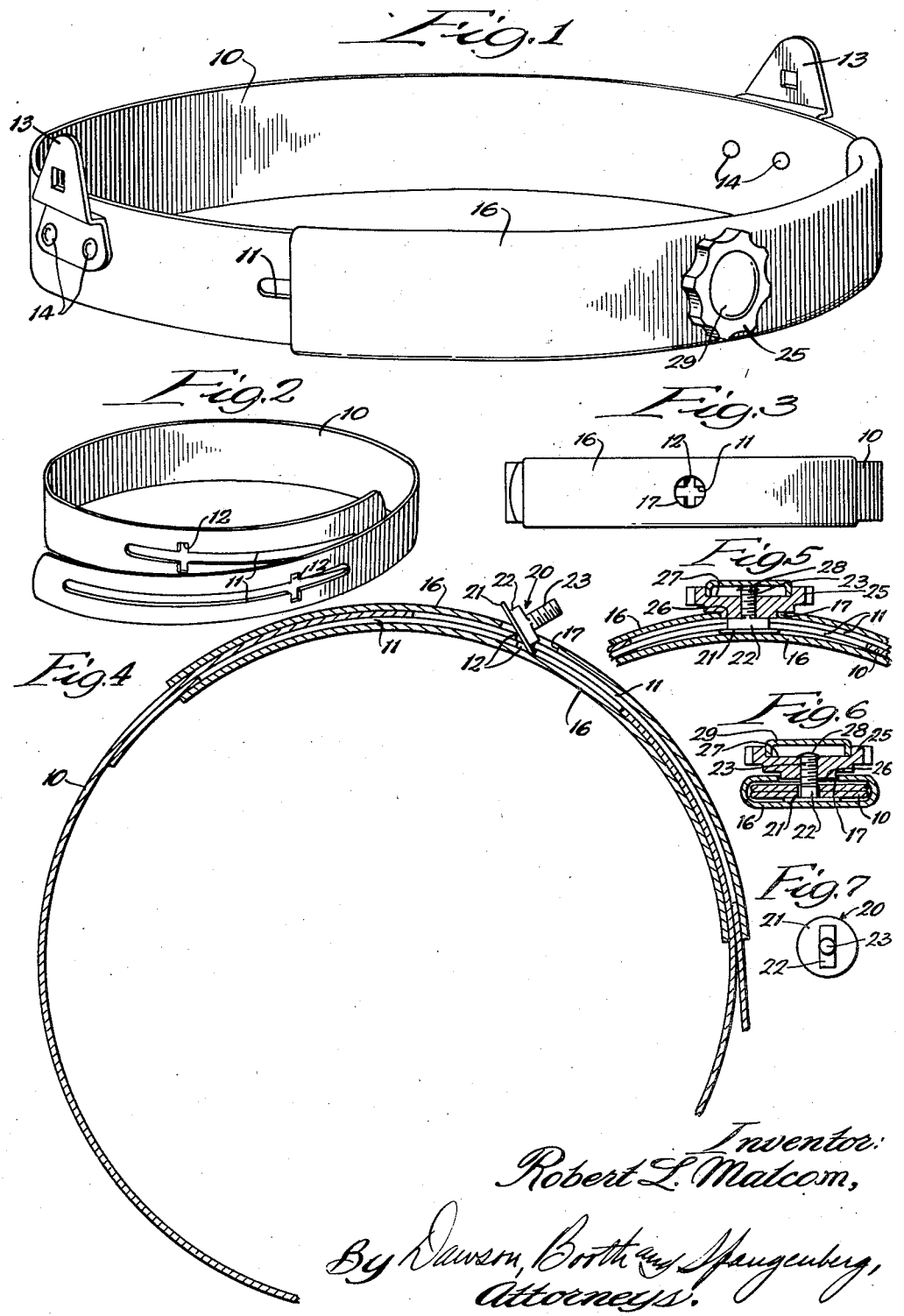
Inventor:
Robert L. Malcom,
By Dawson, Booth and Spangenburg,
Attorneys.

Patented Mar. 23, 1948

2,438,409

UNITED STATES PATENT OFFICE 2,438,409

ADJUSTABLE HEADBAND CONSTRUCTION

Robert L. Malcom, Chicago, Ill., assignor to Chicago Eye Shield Company, a corporation of Illinois Application August 7, 1946, Serial No. 688,917

2 Claims. (Cl. 2—8)

1

This invention relates to an adjustable head band construction and is an improvement over the adjustable head band construction of my copending application Serial No. 598,848, filed June 11, 1945.

The principal object of this invention is to provide an improved head band construction wherein the component parts thereof may be more readily asssembled.

In this respect the head band of this invention includes a curved strip having adjacent the ends thereof elongated slots formed lengthwise of the strip and transverse slots intersecting the elongated slots. The ends of the strip are in overlapping relationship and are covered by a sleeve having an aperture in the outer wall thereof. A bolt member has a head located between the inner wall of the sleeve and the strip ends, an elongated shoulder located in the elongated slots of the strip, and a shank extending into the aperture of the outer wall of the sleeve. A nut member carried by the shank of the bolt member clamps the ends of the strip between the head of the bolt member and the nut member and the elongated shoulder cooperates with the elongated slots to prevent rotation of the bolt member upon tightening or loosening the nut member during the adjusting operations.

In assembling the component parts of the head band the elongated and transverse slots of the strip are first aligned with each other and with the aperture in the outer wall of the sleeve. Then the head of the bolt member is inserted through the aperture and the aligned transverse slots and the transverse slots are moved out of alignment to retain the bolt member in place on the head band. Preferably the transverse slots of the strip are never in alignment during the normal use of the head band or in the normal adjustment thereof so that retention of the bolt member in the head band is at all times assured. Provision is also made for retaining the bolt and nut members in assembled relation to prevent loss thereof.

In accordance with this invention, therefore, there is provided an adjustable head band construction which has a substantially smooth inner surface, which is readily adjustable without being removed from the wearer's head, which remains in adjusted position until readjusted, which is simple to assemble, and in which the parts remain assembled during the normal use and adjustment thereof.

Other objects and advantages will become apparent to those skilled in the art upon reference to the accompanying specification, claims, and drawing, in which—

Fig. 1 is a perspective view of the assembled adjustable head band construction;

Fig. 2 is a perspective view of the curved strip forming a portion of the head band;

2

Fig. 3 is an elevational view of the curved strip and sleeve showing the transverse slots and the aperture in alignment;

Fig. 4 is a partial sectional view through the head band construction showing the manner of insertion of the bolt member;

Fig. 5 is a partial horizontal sectional view through the head band construction;

Fig. 6 is a vertical sectional view through the head band construction; and

Fig. 7 is a plan view of the bolt member.

The adjustable head band construction includes a curved strip 10 preferably made of a relatively stiff plastic material and which is provided adjacent the ends thereof with elongated slots 11 running lengthwise of the strip and with transverse slots 12 intersecting the elongated slots 11. The strip 10 may also be provided with brackets 13 secured thereto as by rivets 14 for the purpose of supporting a helmet or other similar device.

The head band construction also includes a sleeve 16 preferably made of a relatively stiff plastic material. The sleeve 16 is curved as illustrated and is provided in its outer wall with an aperture 17. The sleeve is located around the overlapping ends of the strip 10.

The overlapping ends of the strip 10 are clamped together in adjusted position by means of a bolt and nut arrangement which includes a bolt member generally designated at 20, having a head 21, an elongated shoulder 22, and a screw threaded shank 23. The head 21 of the bolt member is located between the ends of the strip 10 and the inner wall of the sleeve 16 and the elongated shoulder 22 is contained within the elongated slots 11 of the strip 10. Preferably the depth of the shoulder 22 is less than the thickness of the overlapped end portions of the strip 10. The shank 23 extends into the aperture 17 of the sleeve 16.

In assembling the bolt member 20 in the head band construction, the sleeve 16 is first placed over the overlapping ends of the strip 10 and then the transverse slots 12 are aligned with respect to each other and are brought into alignment with the aperture 17 in the sleeve 16, as shown in Figs. 3 and 4. The head 21 of the bolt member is then inserted through the aperture 17 and the transverse slots 12 so that the head 21 then assumes a position between the ends of the strip 10 and the rear wall of the sleeve 16. The transverse slots 12 are then moved out of alignment and the bolt member 20 is thereby retained in place with the elongated shoulder 22 being contained within the elongated slots 11 and with the shank 23 extending into the aperture 17 of the sleeve 16.

A nut member 25 has a screw threaded opening therein to be screw threadedly mounted on the shank 23 of the bolt member. The nut member 25 is provided with an annular shoulder 26 which extends into the aperture 17 of the sleeve member 16 so that when the nut member 25 is tightened, the overlapping ends of the strip 10 are clamped together between the head 21 and the shoulder 26, as is illustrated in Fig. 5. The nut member 25 is also provided with a recess 27 and after the nut member has been applied to the bolt member the end of the shank 23 is peened as at 28 to prevent removal of the nut member 25 from the bolt member 20, and to limit the extent of rotation of the nut member 25. However, the arrangement is such that tightening and loosening of the nut member within a predetermined range is permitted so that the ends of the strip 10 may be adjusted with respect to each other and then clamped in adjusted position. A cap 29 is carried in the recess 27 for covering the end of the shank 23 for enhancing the appearance of the nut member.

In order to adjust the head band the nut member 25 is loosened, the ends of the strips 10 are adjusted to the proper position, and the nut member 25 is tightened to clamp the ends of the strip 10 in the correct adjusted position. During the loosening and tightening of the nut member 25, rotation of the bolt member 20 is prevented by the elongated shoulder 22 located in the elongated slots 11. The shoulder 26 cooperates with the aperture 17 for maintaining the nut and bolt assembly centered with respect to the sleeve 16.

While for purposes of illustration one form of this invention has been disclosed, other forms thereof may become apparent to those skilled in the art upon reference to this disclosure and, therefore, this invention is to be limited only by the scope of the appended claims and prior art.

I claim as my invention:

1. A head band comprising, a curved strip having adjacent the ends thereof elongated slots formed lengthwise of the strip and transverse slots intersecting the elongated slots, the ends of the strip being in overlapping relationship, a bolt member having a shank and a head and an elongated shoulder with the elongated shoulder located in the elongated slots and with the head adapted to be inserted through the transverse slots when they are aligned, and a nut member carried by the shank for clamping the ends of the strips between the head and the nut member.

2. A head band comprising, a curved strip having adjacent the ends thereof elongated slots formed lengthwise of the strip and transverse slots intersecting the elongated slots, the ends of the strip being in overlapping relationship, a sleeve around the overlapping ends of the strip and having an aperture in the outer wall thereof, a bolt member having a shank and a head and an elongated shoulder with the elongated shoulder located in the elongated slots and the shank extending into the aperture and with the head adapted to be inserted through the transverse slots when they are aligned with the aperture, and a nut member carried by the shank for clamping the ends of the strips between the head and the nut member.

ROBERT L. MALCOM.

REFERENCES CITED

The following references are of record in the file of this patent:

UNITED STATES PATENTS

| Number | Name | Date |
| --- | --- | --- |
| 2,194,492 | Bowers | Mar. 26, 1940 |
| 2,213,118 | Bowers | Aug. 27, 1940 |
| 2,328,042 | Welsh | Aug. 31, 1943 |